US012513482B2

(12) United States Patent
Koppens

(10) Patent No.: US 12,513,482 B2
(45) Date of Patent: Dec. 30, 2025

(54) DETERMINING VIRTUAL AUDIO SOURCE POSITIONS

(71) Applicant: KONINKLIJKE PHILIPS N.V., Eindhoven (NL)

(72) Inventor: Jeroen Gerardus Henricus Koppens, Nederweert (NL)

(73) Assignee: Koninklijke Philips N.V., Eindhoven (NL)

( * ) Notice: Subject to any disclaimer, the term of this patent is extended or adjusted under 35 U.S.C. 154(b) by 157 days.

(21) Appl. No.: 18/290,825

(22) PCT Filed: Jul. 26, 2022

(86) PCT No.: PCT/EP2022/070876
§ 371 (c)(1),
(2) Date: Jan. 22, 2024

(87) PCT Pub. No.: WO2023/011970
PCT Pub. Date: Feb. 9, 2023

(65) Prior Publication Data
US 2025/0097656 A1 Mar. 20, 2025

(30) Foreign Application Priority Data
Aug. 5, 2021 (EP) .................................... 21189872

(51) Int. Cl.
*H04S 7/00* (2006.01)

(52) U.S. Cl.
CPC .............. *H04S 7/302* (2013.01); *H04S 7/305* (2013.01); *H04S 2400/11* (2013.01)

(58) Field of Classification Search
CPC .......... H04S 7/302; H04S 7/304; H04S 7/305; H04S 2400/11; H04S 2420/01; G10K 15/10
USPC .......................................................... 381/303
See application file for complete search history.

(56) References Cited

U.S. PATENT DOCUMENTS

2020/0037091 A1 1/2020 Jeon et al.

FOREIGN PATENT DOCUMENTS

EP 3828882 A1 * 6/2021 ............. H04S 7/303
WO 2021067183 A1 4/2021

OTHER PUBLICATIONS

Jean-Marc Jot and Antoine Chaigne, "Digital delay networks for designing artificial reverberators", 90th AES Convention, 1991, 17 pages.

(Continued)

*Primary Examiner* — Paul Kim

(57) ABSTRACT

An acoustic image source model for early reflections in a room is generated by iteratively mirroring (305) rooms around boundaries (e.g. walls) of rooms of the previous iteration. Determination of mirror positions in the image rooms for an audio source in the original room is performed by determining (605, 607) matching reference positions in the two rooms and a relative mapping of directions between the two rooms (611). A mirror position in the mirror room from an audio source in the original room is determined (701, 703, 705) by mapping relative offsets between the positions of the audio source and the reference positions. The approach may provide a computationally very efficient approach.

25 Claims, 5 Drawing Sheets

(56) References Cited

OTHER PUBLICATIONS

Jean-Marc Jot, "An analysis/synthesis approach to real-time artificial reverberation", Proc. ICASSP-92, 1992, vol. 2, pp. 221-224.

Fritz Menzer and Christof Faller, "Binaural reverberation using a modified Jot reverberator with frequency dependent interaural coherence matching", 126th AES Convention Munich, May 2009, pp. 1-6.

https://reuk.github.io/wayverb/image_source.html downloaded Dec. 14, 2023, pp. 1-49.

Stephen G. McGovern, Fast image method for impulse response calculations of box-shaped rooms, Applied Acoustics 70 (2009) 182-189.

Allen et al "Image Method for Efficiently Simulating Small Room Acoustics" The Journal of Acoustical Society of America 1979 65(4) p. 943-950.

Brinkmann, Erbes, Weinzierl et al Extending the Closed Form Image Source Model for Source Directivity (Digital Appendix) Proceedings DAGA 2018, p. 1298-1301.

International Search Report and Written Opinion from PCT/EP2022/070876 mailed Nov. 24, 2022.

* cited by examiner

DETERMINING VIRTUAL AUDIO SOURCE POSITIONS

CROSS-REFERENCE TO PRIOR APPLICATIONS

This application is the U.S. National Phase application under 35 U.S.C. § 371 of International Application No. PCT/EP2022/070876, filed on Jul. 26, 2022, which claims the benefit of EP Patent Application No. EP 21189872.1, filed on Aug. 5, 2021. These applications are hereby incorporated by reference herein.

FIELD OF THE INVENTION

The invention relates to an apparatus and method for determining positions for virtual audio sources representing reflections of an audio source in a room, and in particular, but not exclusively, to virtual audio source for rendering audio in an Augmented/Virtual Reality application.

BACKGROUND OF THE INVENTION

The variety and range of experiences based on audiovisual content have increased substantially in recent years with new services and ways of utilizing and consuming such content continuously being developed and introduced. In particular, many spatial and interactive services, applications and experiences are being developed to give users a more involved and immersive experience.

Examples of such applications are Virtual Reality (VR), Augmented Reality (AR), and Mixed Reality (MR) applications which are rapidly becoming mainstream, with a number of solutions being aimed at the consumer market. A number of standards are also under development by a number of standardization bodies. Such standardization activities are actively developing standards for the various aspects of VR/AR/MR systems including e.g. streaming, broadcasting, rendering, etc.

VR applications tend to provide user experiences corresponding to the user being in a different world/environment/scene whereas AR (including Mixed Reality MR) applications tend to provide user experiences corresponding to the user being in the current environment but with additional information or virtual objects or information being added. Thus, VR applications tend to provide a fully immersive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented/Mixed Reality.

As an example, a service being increasingly popular is the provision of images and audio in such a way that a user is able to actively and dynamically interact with the system to change parameters of the rendering such that this will adapt to movement and changes in the user's position and orientation. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

In addition to the visual rendering, most VR/AR applications further provide a corresponding audio experience. In many applications, the audio preferably provides a spatial audio experience where audio sources are perceived to arrive from positions that correspond to the positions of the corresponding objects in the visual scene. Thus, the audio and video scenes are preferably perceived to be consistent and with both providing a full spatial experience.

For example, many immersive experiences are provided by a virtual audio scene being generated by headphone reproduction using binaural audio rendering technology. In many scenarios, such headphone reproduction may be based on headtracking such that the rendering can be made responsive to the user's head movements, which highly increases the sense of immersion.

However, in order to provide a highly immersive, personalized, and natural experience to the user, it is important that the rendering of the audio scene is as realistic as possible, and for combined audiovisual experiences, such as many VR experiences, it is important that the audio experience closely matches that of the visual experience, i.e. that the rendered audio scene and video scene closely match.

In order to provide a high quality experience, and in particular for the audio to be perceived as being realistic, it is important that the acoustic environment is characterized by an accurate and realistic model. This is required whether the audio scene being presented is a purely virtual scene or whether the scene is desired to correspond to a specific real-world scene.

In simulating room acoustics, or more generally environment acoustics, the reflections of sound waves on the walls, floor and ceiling of an environment (if they exist), cause delayed and attenuated (typically frequency dependent) versions of the audio source signal to reach the listener from different directions. This causes an impulse response that will be referred to as a Room Impulse Response (RIR).

As illustrated in FIG. 1, the room impulse response consists of a direct sound/anechoic part that depends on the distance of the audio source to the listener, followed by a reverberant portion that characterizes the acoustic properties of the room. The size and shape of the room, the position of the audio source and listener in the room and the reflective properties of the room's surfaces all play a role in the characteristics of this reverberant portion.

The reverberant portion can be broken down into two temporal regions, usually overlapping. The first region contains so-called early reflections, which are isolated reflections of the audio source on walls or obstacles inside the room before reaching the listener. As the time lag increases, the number of reflections present in a fixed time interval increases, now also containing secondary reflections and higher orders.

The second region in the reverberant portion is the part where the density of these reflections increases to a point that they cannot be isolated and separated by the human brain. This region is called the diffuse reverberation, late reverberation, or reverberation tail.

The reverberant portion contains cues that give the auditory system information about the distance of the source, size and acoustical properties of the room. The energy of the reverberant portion in relation to that of the anechoic portion largely determines the perceived distance of the audio source. The level and delay of the earliest reflections may give cues about how close the audio source is to a wall, and its filtering by anthropometrics may strengthen the assessment of which wall, floor or ceiling.

The density of the (early-) reflections contributes to the perceived size of the room. The time that it takes for the reflections to drop 60 dB in energy level, indicated by $T_{60}$, reverberation time, are a measure for how fast reflections dissipate in the room. The reverberation time gives information on the acoustical properties of the room; whether its walls are very reflective (e.g. bathroom) or there is much absorption of sound (e.g. bedroom with furniture, carpet and curtains).

For reverberation to provide an immersive experience, multiple RIRs are needed to express the direction from which the reflections reach the listener. These may be associated with a loudspeaker setup where each RIR is related to one of the speakers at a known position. Panning algorithms like VBAP may be employed to generate the RIRs from the known directions of the reflections.

Furthermore, immersive RIRs may be dependent on a user's anthropometric properties when it is a part of a Binaural Room Impulse Response (BRIR), due to the RIR being filtered by the head, ears and shoulders; i.e. the Head Related Impulse Responses (HRIRs).

The reflections in the late reverberation cannot be isolated anymore, and can therefore be simulated parametrically with, e.g., a parametric reverberator such as a feedback delay network like the Jot reverberator. For early reflections, the direction of incidence and distance dependent delays are important cues to humans to extract information about the room and the relative position of the audio source. Therefore, the simulation of early reflections must be more explicit than the late reverberation for a realistic immersive experience.

One approach to modelling early reflections is to mirror the audio sources in each of the room's boundaries to generate virtual audio sources that represent the reflections. Such a model is known as an image-source model and is described in Allen J B, Berkley D A. "Image method for efficiently simulating small-room acoustics", The Journal of the Acoustical Society of America 1979; 65 (4): 943-50. EP3828882 discloses an example of the implementation of such a method. However, although such a model may provide an efficient and high-quality modelling of early reflections, compared to less room-shape limited approaches such as ray-tracing or finite element modelling, it also tends to have some disadvantages. Specifically, it still tends to be relatively complex and to have a high computational resource requirement, especially in order to find the positions of virtual sources of the reflections. The processes required for determining the mirror positions, and especially the geometric computations required for mirroring around room boundaries tend to be complex and resource demanding. The disadvantages tend to increase the higher the number of reflections that are considered and in many practical applications the number of reflections is accordingly limited leading to reduced accuracy and quality of the model, which results in a reduced user experience.

Hence, an improved model and approach for determining positions for virtual audio sources representing reflections would be advantageous. In particular, an approach/model that allows improved operation, increased flexibility, reduced complexity, facilitated implementation, an improved audio experience, a reduced complexity, reduced computational burden, improved audio quality, improved model accuracy and quality, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided the method of determining virtual audio source positions for audio sources representing reflections of a first audio source in a first room, the method comprising: receiving data describing boundaries of a first room; generating a set of mirror rooms of the first room, each mirror room resulting from a number of mirrorings with each mirroring being a mirroring of a previous mirror room around a boundary of the previous mirror room, an initial previous mirror room for the number of mirrorings being the first room; providing for at least a first mirror room of the set of mirror rooms a mapping of directions in the first room to directions in the first mirror room; determining a source reference position in the first room; determining a first mirror reference position in the first mirror room, the first mirror reference position being a position in the first mirror room resulting from applying the mirroring resulting in the first mirror room to the first source reference position; determining a source position offset in the source room for a first audio source, the source position offset representing a position offset between the source reference position and a position in the first room of the first audio source; determining a first mirror position offset in the first mirror room for the first audio source; determining a mirror position for the first audio source in the first mirror room from the first mirror reference position and the first mirror position offset; wherein determining the first mirror position offset comprises determining the first mirror position offset by applying the mapping to the source position offset.

The invention may provide improved and/or facilitated determination of mirror/virtual positions for virtual audio sources representing reflections in a room. The approach may allow a facilitated and/or more efficient generation of a model for early reflections in a room. The approach may in many embodiments substantially facilitate determination of mirror positions and may substantially reduce the number and/or complexity of the calculations required to determine mirror positions corresponding to reflections. The approach may in many embodiments allow an accurate model representing reflections in a room to be generated with reduced computational requirements and/or reduced complexity.

The approach may be used to generate/update an image-source model.

The approach may be particularly suitable to dynamic applications where e.g. one or more audio sources in a room may move resulting in changes in the reflections for the audio source(s). The corresponding changes in the mirror positions may typically be determined with reduced complexity thereby allowing a facilitated dynamic adaptation to the audio source movement, including an accurate representation of the resulting changes in the properties of the early reflections. In particular, the approach may in many embodiments allow that relatively complex operations required to determine and evaluate mappings/mirrorings to different mirror rooms to represent more than one reflection may be performed only once at initialization with subsequent effects resulting from movement being determined with substantially lower complexity.

The approach may result in lower complexity and resource demanding processing to represent reflections in the first room. The approach may specifically allow an image source model of a given quality/complexity to be generated/updated with substantially lower computational burden.

The method may be a computer implemented method. The method may be carried out by a computer/processor. The method may in many embodiments include the step of generating an audio signal comprising a component from the audio source as being positioned at the mirror position.

There may be provided a data processing apparatus/device/system comprising means for carrying out the method.

A mirror room may be a room resulting from one or more mirror operations around an edge/side/boundary of the original room and/or one or more previously generated mirror rooms. A mirror position may be a position in a mirror room. The mirror room/mirror position may be virtual positions.

The first room (and the mirror rooms) may be represented as a two dimensional rectangle and/or a three dimensional rectangle. The first room may be a two-dimensional or three-dimensional orthotope, also known as a right rectangular prism, rectangular cuboid, or rectangular parallelepiped, and often in the field referred to as a shoebox room.

A boundary for the room may be a planar element demarcating/delimiting/bounding the room, such as a wall, floor or ceiling. A boundary may be an acoustically reflective element, or may e.g. in some cases be a virtual or theoretical (arbitrary) delineation of a boundary where no (significantly) acoustically reflective element is present.

A room may be any acoustic environment demarcated by substantially planar and typically acoustically reflective elements. The planar elements may be pairwise parallel, and a two dimensional room may comprise two such parallel pairs and a three dimensional room may comprise three such parallel pairs (corresponding to four walls, a floor and a ceiling).

The mirroring of an audio source across a boundary may correspond to determining a mirrored audio source position by mirroring the audio source position of the audio source around the boundary. A previous mirror room may be a room belonging to a set comprising the first room and mirror rooms generated by a previous mirroring of the number of mirrorings.

A mirror audio source position for a reflection audio source in a neighbor mirror room may correspond to the position resulting from mirroring an audio source position for the audio source in the source/first room around a boundary.

In accordance with an optional feature of the invention, the mapping is represented by a mapping matrix and applying the mapping to the source position offset comprises multiplying the mapping matrix and the source position offset.

This may allow improved performance and/or operation in many embodiments. It may in many embodiments allow a more efficient operation and may reduce the computational resource burden/requirement substantially. The source position offset may be represented by a plurality of coordinates, including being represented as coordinate offsets, and the matrix multiplication may map these coordinate offsets into coordinate offsets corresponding to the first mirror position offset.

In accordance with an optional feature of the invention, the source position offset is a two-dimensional offset and the mapping matrix is a 2×2 matrix.

This may provide improved and/or facilitated operation in many embodiments. The approach may result in lower complexity and resource demanding processing to represent reflections in the first room.

In accordance with an optional feature of the invention, the source position offset is a three-dimensional offset and the mapping matrix is a 3×3 matrix.

This may provide improved and/or facilitated operation in many embodiments. The approach may result in lower complexity and resource demanding processing to represent reflections in the first room.

In accordance with an optional feature of the invention, the number of mirrorings for the first room is at least two and the mapping matrix is a combination of a plurality of boundary mirror mapping matrices, each boundary mirror mapping matrix representing a change of directions resulting from a mirroring around a single room boundary.

This may provide improved and/or facilitated operation. It may in many embodiments provide an efficient determination and representation of the reflections occurring from boundaries of a room. In particular, it may facilitate and/or improve representation of multiple reflections of the same audio source in the first room.

In accordance with an optional feature of the invention, each room boundary of the first room is linked with one boundary mirror mapping matrix and the mapping is a combination of the boundary mirror mapping matrices linked with room boundaries of mirrorings of the number of mirrorings for the first mirror room.

This may facilitate and/or improve operations to represent multiple reflections in the first room.

In accordance with an optional feature of the invention, parallel room boundaries of the first room are linked with the same boundary mirror mapping matrix.

This may provide improved and/or facilitated operation. It may in many embodiments provide an efficient determination and representation of the reflections occurring from boundaries of a room. In particular, it may reduce computational resource requirements of determining the mapping and/or the first mirror position offset.

In accordance with an optional feature of the invention, the mapping is a distance preserving mapping.

This may provide improved performance and/or operation. It may in many embodiments achieve a reduced computational resource requirement for a given accuracy of the acoustic reflection environment of the first room.

In accordance with an optional feature of the invention, a distance of the first mirror position offset is equal to a distance of the source position offset.

This may provide improved performance and/or operation in many embodiments. It may in many embodiments achieve a reduced computational resource requirement for a given accuracy of the acoustic reflection environment of the first room. The distance for an offset may be a size/magnitude of the offset (and specifically of a vector representing the offset).

In accordance with an optional feature of the invention, the method further comprises: determining a room boundary position for a boundary of the first room; determining a boundary position offset in the source room for the room boundary position, the boundary position offset representing a position offset between the source reference position and the room boundary position; determining a boundary position offset in the first mirror room by applying the mapping to the boundary position offset; determining a mirror boundary position for the first mirror room from the first mirror reference position and the boundary position offset.

This may provide improved performance and/or operation in many embodiments. It may in many embodiments achieve a reduced computational resource requirement for a given accuracy of the acoustic reflection environment of the first room and may in particular facilitate determination of the geometric properties of the mirror room. The room boundary position may be a position comprised in one or more boundaries, such as specifically a position of a corner of the room.

In accordance with an optional feature of the invention, the first room is an orthotope and the source reference position and the source position offset are represented by coordinates of coordinate axes which are not aligned with edges of the orthotope.

This may provide improved performance and/or operation in many embodiments.

In accordance with an optional feature of the invention, the method further comprises determining a room response function for the first room, the room response function comprising a reflection component representing audio from the audio source as positioned at the mirror position.

The invention may in many embodiments allow an improved representation of the reflection properties of the room and/or reduced complexity.

In accordance with an optional feature of the invention, the method comprises rendering an audio output signal comprising a component from the audio source as being positioned at the mirror position.

The invention may provide improved and/or facilitated rendering of audio providing an improved user experience with typically a perception of a more realistic environment.

According to an aspect of the invention there is provided an apparatus for determining virtual audio source positions for audio sources representing reflections of a first audio source in a first room, the apparatus comprises a processing circuit arranged to: receive data describing boundaries of a first room; generate a set of mirror rooms of the first room, each mirror room resulting from a number of mirrorings with each mirroring being a mirroring of a previous mirror room around a boundary of the previous mirror room, an initial previous mirror room for the number of mirrorings being the first room; provide for at least a first mirror room of the set of mirror rooms a mapping of directions in the first room to directions in the first mirror room; determine a source reference position in the first room; determine a first mirror reference position in the first mirror room, the first mirror reference position being a position in the first mirror room resulting from applying the mirroring resulting in the first mirror room to the first source reference position; determine a source position offset in the source room for a first audio source, the source position offset representing a position offset between the source reference position and a position in the first room of the first audio source; determine a first mirror position offset in the first mirror room for the first audio source; determine a mirror position for the first audio source in the first mirror room from the first mirror reference position and the first mirror position offset; wherein determining the first mirror position offset comprises determining the first mirror position offset by applying the mapping to the source position offset.

This may provide improved performance and/or reduced complexity/resource usage in many embodiments. It may typically allow an improved model to be generated with reduced complexity and computational resource usage.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
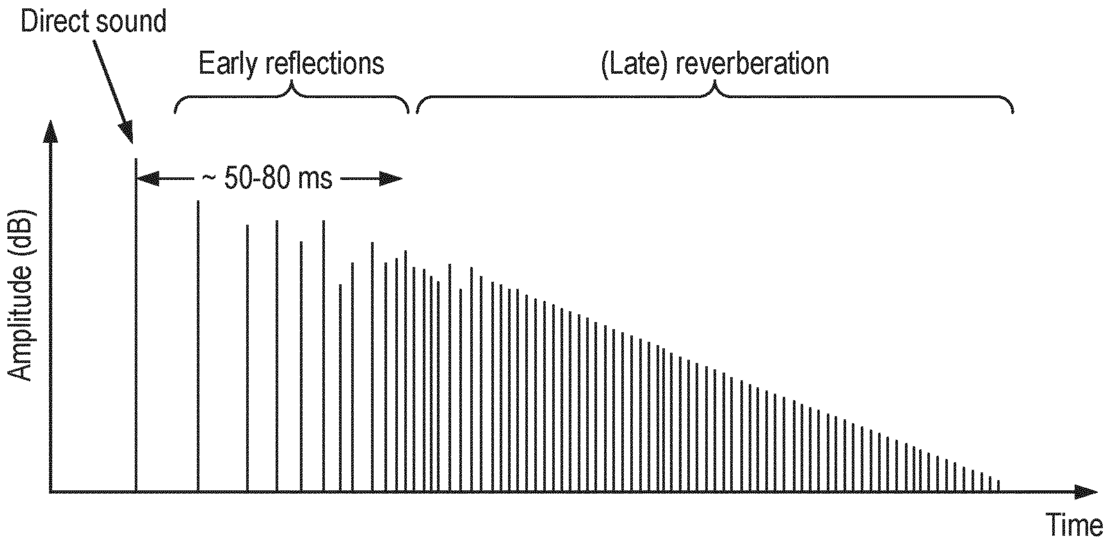
FIG. 1 illustrates an example of a components of an acoustic room response.

Audio rendering aimed at providing natural and realistic effects to a listener typically includes rendering of an acoustic environment. The rendering is based on a model of the acoustic environment which typically includes modelling a direct path, (early) reflections, and reverberation. The following description will focus on an efficient approach for generating a suitable model for (early) reflections in a real or virtual room.

The approach will be described with reference to an audio rendering apparatus comprising elements illustrated in FIG. 2. The audio rendering apparatus of FIG. 2 comprises a receiver 201 which is arranged to receive room data characterizing a first room which represents an acoustic environment to be emulated by the rendering. The room data specifically describes boundaries of the first room. The receiver 201 may further receive data for at least one audio source position for an audio source in the room. Typically, data may be received indicating audio source positions for a plurality of audio sources. Further, in many embodiments the positions may change dynamically, and the system may be arranged to adapt to such position changes. The receiver may further receive audio data for the audio sources with the audio data representing the audio generated by the audio source and may render audio from the audio source. The audio rendering apparatus is arranged to render the audio with characteristics such that the audio is perceived as realistic audio for the room (and specifically with early reflections as well as typically a direct path component and a reverberation component)

The room will in the following also be referred to as the original room (or the first room or source room) and the audio source in the original room will also be referred to as the original audio source in order to differentiate to generated virtual (mirrored) rooms and virtual (mirrored) audio sources generated for the described reflection model.

The receiver 201 may be implemented in any suitable way including e.g. using discrete or dedicated electronics. The processing circuit 203 may for example be implemented as an integrated circuit such as an Application Specific Integrated Circuit (ASIC). In some embodiments, the circuit may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The receiver 201 may receive data, and specifically room data and/or audio data, from any suitable source and in any suitable form, including e.g. as part of an audio signal. The room data may be received from an internal or external source. The receiver 201 may for example be arranged to receive the room/audio data via a network connection, radio connection, or any other suitable connection to an internal source. In many embodiments, the receiver may receive the data from a local source, such as a local memory. In many embodiments, the receiver 201 may for example be arranged to retrieve the room data from local memory, such as local RAM or ROM memory.

The boundaries define the outline of the room and typically represent walls, ceiling, and floor (or for a 2D application typically only walls). The room is a 2D or 3D orthopod, such as a 2D rectangle or 3D rectangle (shoebox shape). The boundaries are pairwise parallel and are substantially planar. Further the boundaries of one pair of parallel boundaries is perpendicular to the boundaries of the other pair(s) of parallel boundaries. The boundaries specifically define an orthopod (2D or 3D). The boundaries may reflect any physical property, such as any material etc. The boundaries may also represent any acoustic property.

The room being described by the room data corresponds to the intended acoustic environment for the rendering and as such may represent a real room/environment or a virtual room/environment. The room may be any region/area/environment which can be delimited/demarcated by four (for 2D) or six (for 3D) substantially planar boundaries that are pairwise parallel and substantially perpendicular between the pairs. The room data may in some embodiments represent a suitable approximation of an intended room that is not pairwise parallel and/or exhibiting right angles between connected boundaries.

In most embodiments, the room data may further include acoustic data for one, more, or typically all of the boundaries. The acoustic property data may specifically include a reflection attenuation measure for each wall which indicates the attenuation caused by the boundary when sound is reflected by the boundary. Alternatively, a reflection coefficient may indicate the portion of signal energy that is reflected in a specular reflection off of the boundary surface. In many embodiments, the attenuation measure may be frequency dependent to model that the reflection may be different for different frequencies. Furthermore, the acoustic property may be dependent on the position on the boundary surface.

The receiver 201 is coupled to a processing circuit 203 which is arranged to generate a reflection model for the room/acoustic environment representing the (early) reflections in the room and allowing these to be emulated when performing the rendering. Specifically, the processing circuit 203 is arranged to determine virtual audio sources that represent reflections of the original audio source in the original room.

The processing circuit 203 may be implemented in any suitable form including e.g. using discrete or dedicated electronics. The processing circuit 203 may for example be implemented as an integrated circuit such as an Application Specific Integrated Circuit (ASIC). In some embodiments, the circuit may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The processing circuit 203 is coupled to a rendering circuit 205 which is arranged to render an audio signal representing the audio source, and typically also a number of other audio sources to provide a rendering of an audio scene. The rendering circuit 205 may specifically receive audio data characterizing the audio from the original audio source and may render this in accordance with any suitable rendering approach and technique. The rendering of the original audio source may include the generation of reflected audio based on the reflection model generated by the processing circuit 203. In addition, signal components for the original audio source corresponding to the direct path and reverberation will typically also be rendered. The person skilled in the art will be aware of many different approaches for rendering audio (including for spatial speaker configurations and headphones, e.g. using binaural processing) and for brevity these will not be described in further detail.

The rendering circuit 205 may thus generate an audio output signal which includes audio from (at least one of) the audio sources of the room. The audio from a given audio source is processed in accordance with the room properties. In particular, the audio output signal is generated to at least include one component representing a reflection of a given audio source with the component being determined as a component that would result from the audio source if this was positioned at a mirror position (of the reflection model). For example, a component may be generated to be perceived to arrive from a direct path from the mirror position and possibly with a (possibly frequency selective) attenuation corresponding to the reflection components of the walls/boundaries of the reflection being modelled.

In many embodiments, a room response function is generated for the original room where this includes a reflection component that represents audio from the audio source as positioned at the mirror position. For example, the room response may include a contribution that represents an acoustic transfer function for a direct path (e.g. time-of-flight delay, distance attenuation and Head-Related Impulse Response) from the mirror position to the listening position modified to include the reflection properties for the walls involved in the reflection being modelled. Typically, the room response is generated from many such contributions with each one representing one early reflection.

The rendering circuit 205 may be arranged to filter each audio source by a room response determined for the room/position and which includes such contributions representing the early reflections.

The rendering circuit 205 may be implemented in any suitable form including e.g. using discrete or dedicated electronics. The rendering circuit 205 may for example be implemented as an integrated circuit such as an Application Specific Integrated Circuit (ASIC). In some embodiments, the circuit may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The processing circuit 203 is specifically arranged to generate a mirror source model for the reflections. In a mirror source model, reflections are modelled by separate virtual audio sources where each virtual audio source is a replicate of the original audio source and has a (virtual) position that is outside of the original room but at such a position that the direct path from the virtual position to a listening position exhibits the same properties as the reflected path from the original audio source to the listening position. Specifically, the path length for the virtual audio source representing a reflection will be equal to the path length of the reflected path from the original source to the listening position. Further, the direction of arrival at the listening position for the virtual sounds source path will be equal to the direction of arrival for the reflected path. Further, for each reflection by a boundary (e.g. wall) for the reflected path, the direct path will pass through a boundary corresponding to the reflection boundary. The transmission through the model boundary can accordingly be used to directly model the reflection effect, for example an attenuation corresponding to the reflection attenuation for the boundary may be assigned to the transmission through the corresponding model boundary.

A particularly significant property of the mirror source model is that it can be independent of the listening position. The determined positions and room structures are such that they will provide correct results for all positions in the original room. Specifically, virtual mirror audio sources and virtual mirror rooms are generated, and these can be used to model the reflection performance for any position in the original room, i.e. they can be used to determine path length, reflections, and direction of arrival for any position in the original room. Thus, the generation of the mirror source model may be done during an initialization process and the generated model may be used and evaluated continuously and dynamically as e.g. the user is considered to move around (translation and/or rotation) in the original room. The generation of the mirror source model is thus performed without any consideration of the actual listening position but rather a more general model is generated.

However, in cases of moving audio sources, the model needs to be updated to reflect how the movement impact the reflections. Specifically, as audio source positions change in the original room, the corresponding mirror positions of audio sources representing the reflections also change. This requires the model to be updated to reflect the new mirror positions. In many embodiments, the model may need to be updated relatively frequently to reflect the new positions and mirror positions. However, the process of determining the mirror positions tend to be complex and resource demanding and accordingly such updating tends to be complex and resource demanding. In many cases, the perceived accuracy of the rendered audio and the resulting user experience may be constrained by the available computational resource. An improved trade-off between the perceived quality of the rendered audio (and specifically how realistic this seems) and the computational resource requirements is desired. Accordingly, an efficient and high performing approach for determining/updating mirror positions for audio sources in the original room is highly desired.

The processing circuit 203 may generate a mirror source model where the reflections in the original room can be emulated by direct paths from the virtual mirror audio sources.

Figure 3:
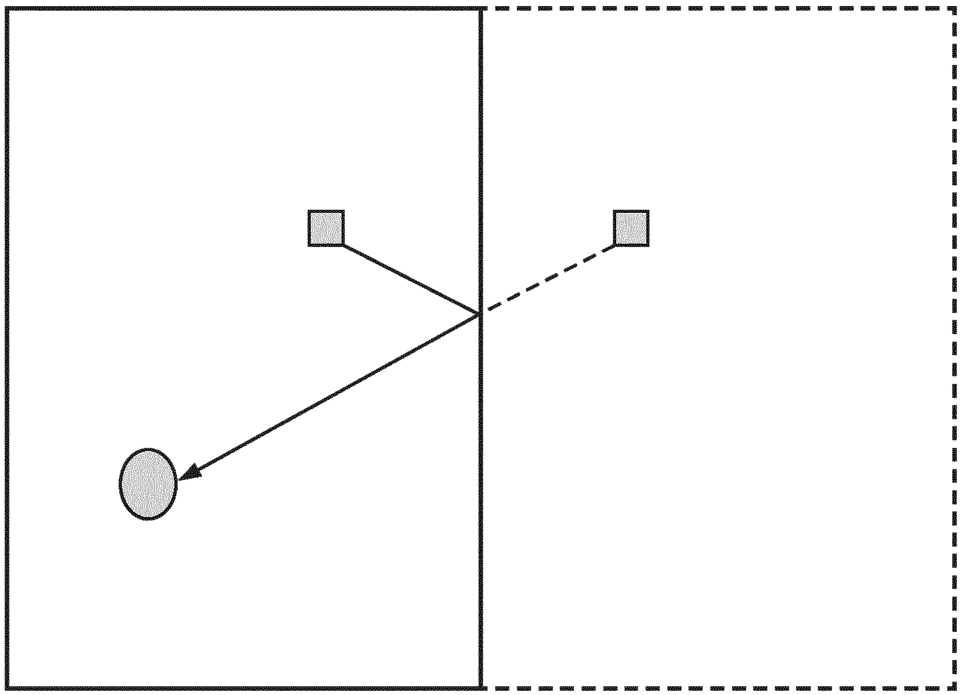
FIG. 3 illustrates an example of a mirroring to model an acoustic reflection of a boundary of a room.

As illustrated in FIG. 3, a reflected sound component can be rendered as the direct path of a mirrored audio source with this representing the correct distance and direction of incidence for the listener. This will be true for all the positions in the original room and no new mirror audio source positions need to be determined for different listening positions. Rather, the virtual mirror sources are valid for every user position within the original room. However, if the audio source positions change, new mirror positions will need to be determined for accurate representation of the reflections.

When generating this virtual mirror source, the reflection effect may as mentioned be taken into account. This may typically be achieved by assigning to each transition between rooms, an attenuation or frequency dependent filtering representing the portion of the audio source's energy that is specularly reflected by the surface of the boundary being crossed.

Figure 4:
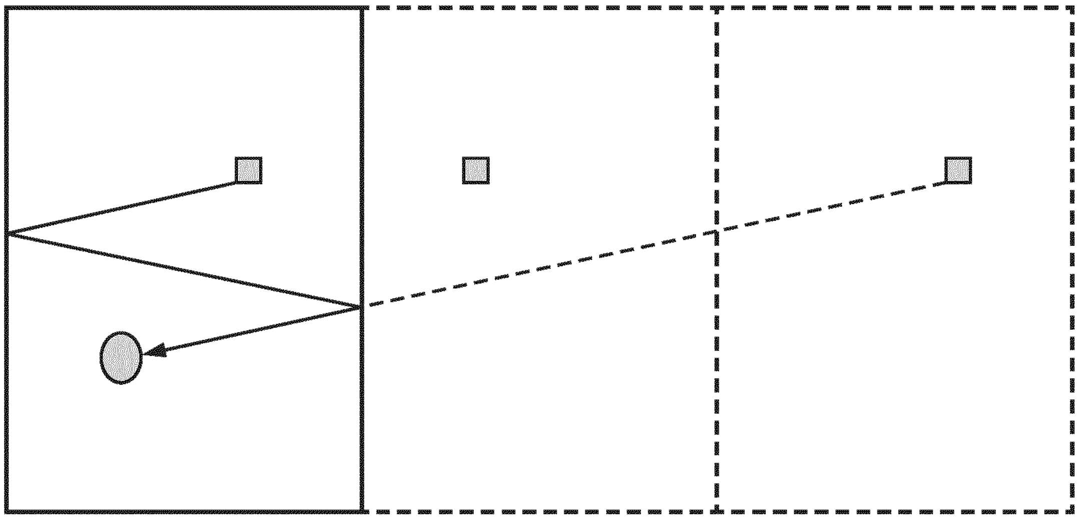
FIG. 4 illustrates an example of a mirroring to model acoustic reflection of two boundaries of a room.

As sound may reach the user through multiple boundary reflections, the approach can be repeated as illustrated in FIG. 4. The processing circuit 203 may for example determine multiple "layers" of mirror rooms and sources to be generated thereby allowing multiple reflections to be modelled. Each "layer" increases the number of reflections of the path, i.e. the first iteration represents sound components reaching the listening position through one reflection, the second iteration represents sound components reaching the listening position through two reflections etc. Each "layer" may correspond to a reflection order, such that for example a first layer represents reflections of a single boundary and is represented by a mirror room resulting from mirroring of the original room, a second layer represents reflections over two boundaries and is represented by a mirror room resulting from a mirroring of a mirror room of the first "layer" around a boundary. Third, fourth, etc layers of mirror rooms may be used to represent higher order reflections as appropriate.

Figure 5:
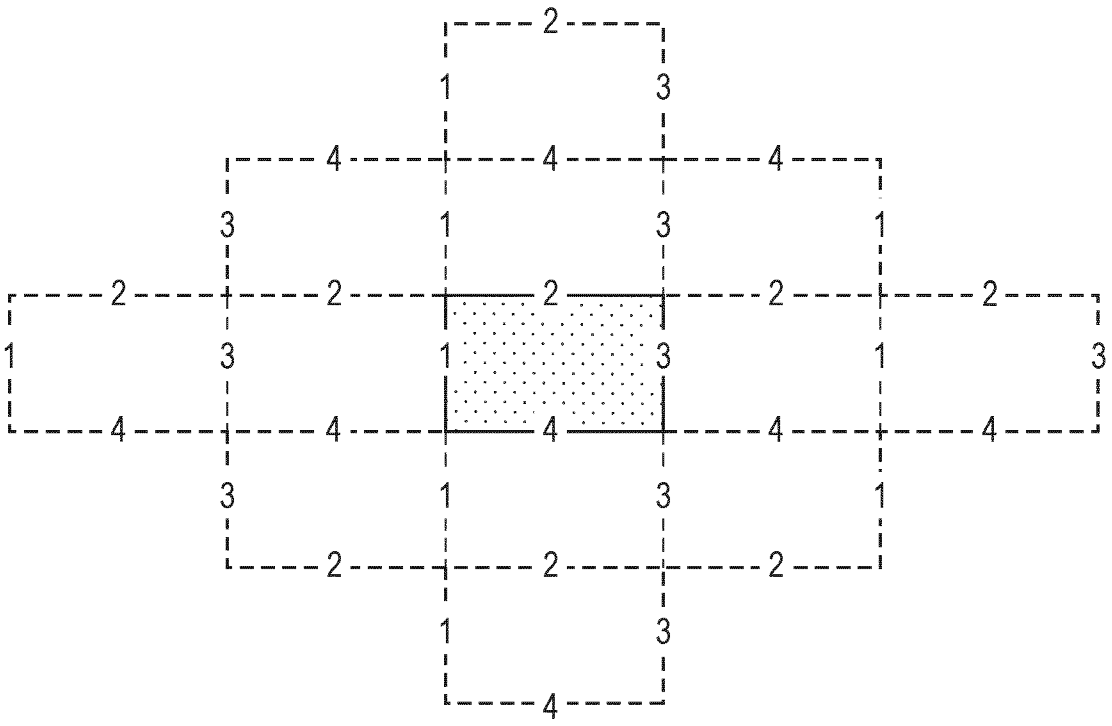
FIG. 5 illustrates an example of mirroring of rooms for an image source model for acoustic reflections in a room.

The approach typically results in a diamond-shaped representation of the original room and mirrored rooms when subsequently mirroring rooms until a certain order/layer representing a given order of reflections is reached (fixed number of mirrorings). This is illustrated in 2D in FIG. 5 for up to the $2^{nd}$ order, i.e. with two mirror layers. In 3D there would be a similar structure when looking at a cross-section through the original room (i.e. the same pattern would be seen in a perpendicular plane through the row of five rooms).

However, whereas principles of the described approach may seem relatively straightforward, the practical implementation is not and indeed the practical considerations are critical to the performance of the approach.

For example, in many applications, the coordinate system used to represent the room and audio source may not be aligned with the directions of the boundaries. This makes the mirroring less straightforward to calculate as it impacts more than one dimension at a time. In such a cases, either the room boundaries and the audio sources have to be rotated to aligned with the coordinate system and all subsequently determined virtual mirror sources have to be rotated inversely, or the mirroring itself has to be performed in more than one dimension (e.g. using normal vectors of the boundary). In many situations, the latter approach will be more efficient.

Further the complexity and computational resource requirements for determining mirror positions tend to be high and thus the complexity issue is exacerbated for applications where audio source positions may change. Such changes are likely in many current practical applications, such as AR, VR, gaming or other immersive experiences. They may e.g. result from animated elements like a character or other user that is talking while walking around, or another active element (animal, robot, vehicle, etc.). Also new sources may be introduced or become active in the room at a later point in time.

For applications where audio source positions may change or new sources may be introduced, mirror positions must be updated. However, the process of performing all the iterative mirrorings tend to require a very high computational resource.

For example, generating mirrored audio sources for every source in the room, at sufficient temporal resolution for realistically tracking the source movements and for sufficient reflection orders (typically $4^{th}$-$5^{th}$ order is needed for good quality) is exceedingly computationally demanding. Indeed, fifth order reflections require calculating 230 unique mirrored sources per original source in the room. For smooth movement, typically an animation update rate of 90 Hz is advised. Therefore, for each moving source in the simulated room, the 230 mirrored sources must be recalculated 90 times per second. In addition to mirroring the sounds sources, the room also need to be mirrored and specifically the room definition is mirrored to create a mirrored room. This adds four more positions to be processed per update for each room.

The number of mirroring operations per second may be estimated as:

$$N_{mirror/s} = 90 \cdot 230 \cdot (N_{sources} + 4)$$

A typical mirroring operation, such as that used in the approach of EP3828882, requires 11 operations, and an additional 25 operations (including a square-root) per mirrored room to initialize the mirroring across a certain plane. Hence the minimum number of operations per second becomes:

$$MOPS = \frac{(90 \cdot 230 \cdot ((N_{sources} + 4) \cdot 11 + 25))}{10^6}$$

This ranges from 1.7-2.6 MOPS for updating one to five sources. Additionally, the bookkeeping and logic for finding unique rooms must be performed. Redoing the image source method at this rate is very computationally intensive.

Figure 2:
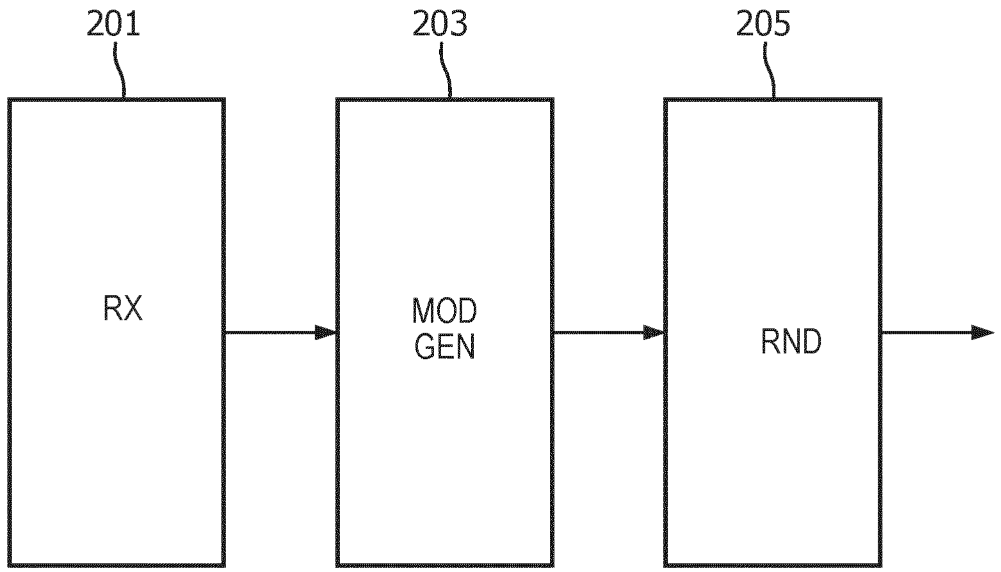
FIG. 2 illustrates an example of elements of an apparatus in accordance with some embodiments of the invention.

The processing circuit 203 of FIG. 2 is arranged to use a highly efficient approach that may provide for a substantially reduced computational resource usage. It may specifically allow faster and/or facilitated determination and updating of mirror positions representing reflections of a room.

The approach is not based on directly mirroring the individual positions until the desired mirror room is reached but instead is based on determining relative position offsets and directly mapping these to the relevant mirror room(s). The approach is based on determining corresponding reference positions in the original room and the individual mirror room, and then performing a typically (position independent and distance preserving) mapping between a relative position offset in the original room to a relative offset in the mirror room. The position in the mirror room is then determined from the resulting relative offset and the mirror reference position. The approach is thus based on a mapping of a relative offset that varies with the audio source position and on reference positions that do not (necessarily) depend on audio source positions.

The mapping may specifically be position and/or offset non-dependent/independent i.e. the mapping that is applied to the source position offset may be independent of the source position offset itself, the reference position, and the audio source position in the original room. Further, the mapping may be distance independent/preserving and specifically the mapping may be such that the length/size of the mirror position offset is the same as the source position offset. The mapping may in many embodiments be dependent only on the geometries of the original room. In many embodiments, the mapping may be independent of properties of the audio source(s).

Figure 6:
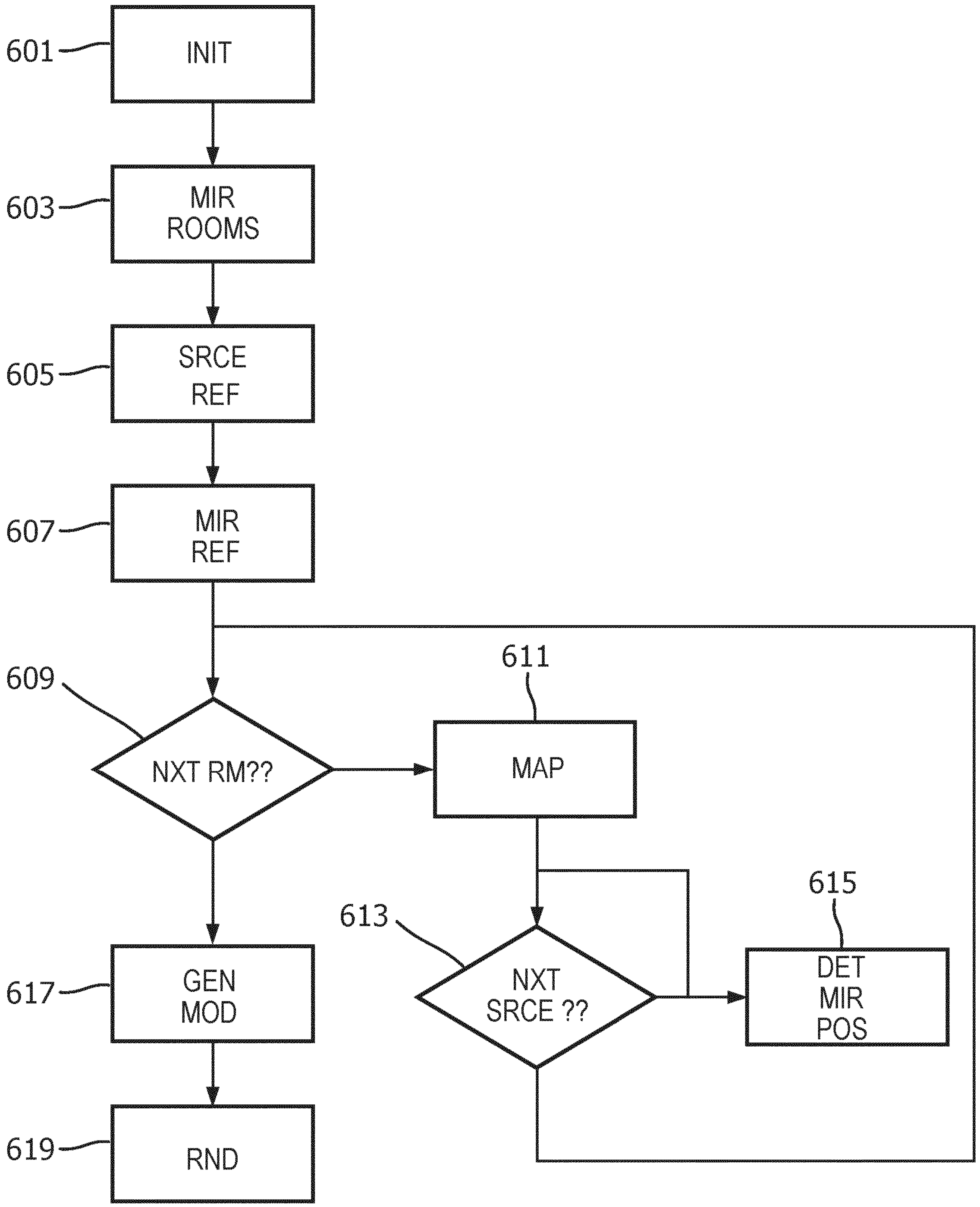
FIG. 6 illustrates an example of elements of a method in accordance with some embodiments of the invention.

An example approach will be described in more detail with reference to the flow chart of FIG. 6.

In step 601 the processing circuit 203 may receive data describing the boundaries of the original room from the receiver 201 as well as possibly audio data and position data for the audio sources. In some embodiments, the different types of data may be received from different sources.

Step 601 is followed by step 603 in which the processing circuit 203 proceeds to generate a set of mirror rooms where each mirror room results from mirroring of either the original room or of a previous mirror room. The mirroring to generate a mirror room is by a mirroring around a boundary of the previous mirror room (which specifically may be the original room). The process will start with the original room being the previous mirror room.

For example, a first mirror room may be generated by mirroring the corners/boundaries/walls of the original room around a first boundary/wall of the original room. A second mirror room may then be generated by mirroring the corners/boundaries/walls of the original room around another boundary/wall of the original room, a third mirror may then be generated by mirroring the corners/boundaries/walls of the original room around a third boundary/wall of the original room etc. The processing circuit 203 may then proceed to generate a second layer of mirror rooms by mirroring the previously generated mirror rooms.

For example, a mirror room may be generated by mirroring the corners/boundaries/walls of a first of the previously generated mirror room around a first boundary/wall of the first of the previously generated mirror rooms, another mirror room by mirroring the corners/boundaries/walls of the thus generated mirror room etc. The process may be repeated for all the other mirror rooms generated in the previous iteration. The process may then be repeated based on the newly generated mirror rooms etc. A given mirror room can typically result from different sequences of mirroring and the processing circuit 203 may be arranged to generate only one copy of each, e.g. by simply discarding sequences/mirroring that lead to a mirror room identical to one already generated. EP3828882 discloses a particularly efficient way of generating mirror rooms and selecting between different sequences.

Step 603 thus describes a set of mirror rooms of the original room where each mirror room corresponds to a reflection over a set of boundaries of the original room (with the set of boundaries corresponding to the boundaries over which the mirroring was performed). For a given audio source in the original room, each mirror room comprises a single reflection audio source such that a direct path from the mirror room position to the listener position matches the reflection path within the original room.

In the example above, the coordinates/properties of the mirror room (e.g. the corner coordinates) may be determined and stored for processing. In some embodiments and applications, each mirror room may e.g. only be represented by a reference position and a mapping that will be described further later. In many embodiments, transfer function properties may be stored, such as specifically one or more reflection coefficients/transfer functions for the reflection properties of the boundaries/walls included in the mirror sequence (and thus corresponding to the reflections represented by the mirror room) may be stored and used for the audio.

In some embodiments, the mirror rooms may not be generated during an initialization procedure but rather the procedure to generate a new mirror room may be performed as and when it is needed/desired. Specifically, the properties for a given mirror room representing a given reflection may be generated only when that reflection is being modelled.

Each mirror room may thus be generated by/correspond to one or more mirrorings of the original room with each mirroring being around a boundary of the original room or a mirror room.

Step 603 is followed by step 605 in which a source reference position is determined in the first room. The source reference position may for example be the center of the room, a corner of the room or may for example be an arbitrary position in the room. In many embodiments, the center of the room may advantageously be used as a source reference position as it may allow the average offset to the source reference position to be minimum (for most practical audio source distributions). The position of the source reference position is typically not critical and in many embodiments any position in the original room can be determined as the source reference position. Indeed, in some embodiments, the source reference position may be updated or changed (although this will typically be with a low update rate as it requires a new determination of corresponding reference positions in the mirror rooms).

Step 605 is followed by step 607 in which a reference position is determined in the mirror rooms. The mirror reference position for a given mirror room is the position in the mirror room which results from applying the mirrorings resulting in the mirror room to the source reference position. Thus, applying a sequence of one or more mirrorings around boundaries of a previous mirror room (with the original room being the first mirror room) to the source reference position results in a mirror reference position.

The determination of a source reference position (605) and reference positions in the mirror rooms (607) may be combined with determining the mirror rooms (603). Particularly, in some embodiments one of the corners of the original room may be the source reference position and the corresponding mirrored corner may be the reference positions in the mirror rooms.

Step 607 is followed by step 609 in which a mirror room is selected. The method then proceeds to determine a mirror position in the mirror room that corresponds to the mirroring of the audio source position of the original room into the mirror room. The mirror position thus corresponds to the position for a direct path to the listening position which matches the reflected path in the original room. In the approach, the determination of the mirror position is not based on (iterated) mirror operations being applied to the audio source positions in the different rooms. Rather, relative position offsets are determined and a (direct) mapping to the mirror room is applied with the mirror position being determined based on the mapped offset.

In particular, step 609 is followed by step 611 in which an offset mapping for the current mirror room is determined. In many embodiments, the mappings are retrieved from a store/memory. For example, mappings may be determined in step 603 and stored in memory for each of the generated mirror rooms. Step 611, may thus simply extract the appropriate mapping for the current mirror room stored in the memory. The mapping data typically includes the mapping matrix, the source reference position in the original room and the reference position in the current mirror room.

Step 611 is followed by step 613 in which a current audio source is selected for which the mirror position is to be determined.

Step 613 is then followed by step 615 in which the mirror position for the selected audio source in the selected mirror room is determined, using the mapping data for the current mirror room.

The method then returns to step 613 in which the next audio source is selected and the method then proceeds to step 615 where the mirror position is determined for the new audio source. Step 613 may advantageously only select sources that have moved a significant amount or that have been newly introduced since the previous mirror source calculation for the current room. If no further audio sources need to be processed the method returns to step 609 where the next mirror room is selected after which the method proceeds to determine the mirror position for the next mirror room. If no further mirror rooms are to be processed the method proceeds in step 617.

It will be appreciated that different criteria for determining how(/which) mirror rooms and audio sources are to be processed may be used in different embodiments depending on the preferences and requirements of the specific implementation. For example, in many embodiments, all mirror rooms up to and including mirror rooms that can be generated by a given number N or less mirrorings may be processed (and generated) and mirror positions in all these mirror rooms for all point audio sources may be determined. In other embodiments, other selections may be used, such as for example only including audio sources for which the volume/level is above a given threshold, or reflections for which the distance is below a given threshold. It will also be appreciated that the order of going through mirror rooms and audio sources may be different in different embodiments (the order/nesting of the loops may be changed) and/or parallel processing may e.g. be applied.

Step 615 is followed by step 617 in which an audio model/room response is generated for the room and the current audio sources and positions. Specifically, the model may for each (or possibly only a subset) of the audio sources determine a transfer function that includes a representation of the direct path, early reflections, and reverberation. The early reflections are represented by contributions (e.g. as a single tap for each reflection) determined based on the mirror positions. Specifically, a reflection may be represented by a contribution corresponding to the audio source modified by a transfer function corresponding to a direct path from the mirror position and taking into account the reflection properties of the boundaries.

The model may be two impulse responses representing a binaural impulse response depending on the position and orientation of the listener. In many embodiments the model may be multiple impulse responses per source where each impulse may be related to a different position in the original room, or loudspeakers in the play area of the user.

The model will typically also include reflection coefficients/filters, or a similar material property, to model the (possibly frequency-dependent) attenuation due to the reflections on the boundaries of the room.

Step 617 is followed by step 619 in which an audio signal is generated based on the audio sources and the determined mirror positions. Specifically, an audio signal may be generated by determining an audio signal contribution for each audio source using the transfer functions determined in step 617 and by generating the audio signal by combining these audio components.

The audio signal may be generated based on impulse responses generated in step 617. This may be done by convolution of the signal with the impulse responses. Potentially in more than one processing step. For example, first the source signal may be processed with the multiple impulse responses and secondly HRTF processing of the resulting multiple signals may be applied with HRTFs corresponding to the positions associated with each impulse response in the original room, relative to the current user position. This latter approach is particularly advantageous in cases where the user is wearing headphones and is head-tracked. It may e.g. avoid the need to recalculate the impulse responses at a high rate.

In many embodiments, a binaural stereo signal may be generated which includes directional cues. Such a signal may be generated using binaural filtering and processing, e.g. using HRTF or BRIR processing, as is well known in the art.

It will be appreciated that many different approaches, algorithms, and processes are known for generating audio signals based on audio sources and positions and that any suitable approach may be used without detracting from the invention.

The approach uses an approach for determining mirror positions which is particularly efficient and which allows substantially reduced computational requirements. The approach may allow a much faster audio processing that for a given computational resource may allow audio processing thereby allowing for a faster update of positions and/or more realistic processing and consequently allowing for a substantially improved user experience.

Figure 7:
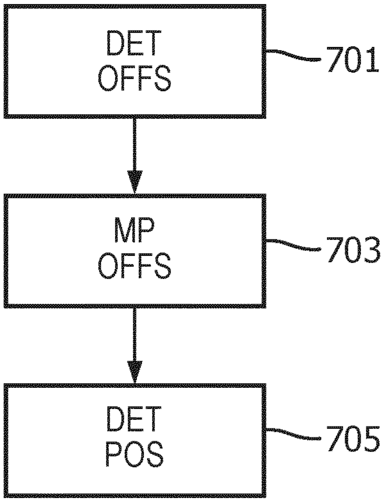
FIG. 7 illustrates an example of elements of a method in accordance with some embodiments of the invention.

The process of step 615 may specifically perform the steps of the approach of FIG. 7. The process may start in step 701 in which a source position offset is determined for the current audio source. The source position offset represents the spatial offset/difference between the source reference position and the position of the audio source. The source position offset may specifically be determined as the vector from the source reference position to the audio source position (or from the source position offset to the source reference position in some embodiments). For example, the processing circuit 203 may subtract the coordinates of the source reference position from the coordinates of the audio source position to generate the source position offset. The offset is typically represented by a vector.

In some embodiments, a (typically monotonic) function may e.g. be applied to the coordinates or differences to determine a source position offset which reflects the difference between the source position offset and the source reference position but which is not directly the vector between these positions (e.g. a (possibly on-linear) scaling may be applied.

Step 701 is followed by step 703 where the retrieved mapping for the current mirror room is applied to the source position offset to generate a mirror position offset. The mapping is such that the mirror position offset corresponds to the source position offset but taking into account the changes in direction that would result from mirroring the source position offset in accordance with the mirrorings of the sequence of mirrorings resulting in the mirror room. Specifically, in many embodiments, the mapping may be a distance preserving mapping such that the size of the mirror position offset (vector) is the same as that of the source position offset (vector). The mapping may perform a direction mapping from the direction of the source position offset to a direction of the mirror position offset that would result from the mirrorings of the source position offset in accordance with the sequence of mirrorings.

In some embodiments, such as where the generation of the source position offset includes a scaling or other function, the mapping may take such a scaling or function into account and include the inverse function, or the inverse function may be applied subsequently. Indeed, such functions and inverse functions may be considered as part of the mapping, and may be considered to be included in the mapping operation.

Step 703 is followed by step 705 in which the mirror position for the audio source (i.e. the position in the mirror room representing the reflection being modelled by the mirror room) is determined from the mirror reference position and the mirror position offset. Specifically, the mirror reference position may be offset in accordance with the mirror position offset to result in the mirror position. For example, in many embodiments, the mirror position offset may be a vector which is added to the coordinates of the mirror reference position to result in the coordinates of the mirror position.

The approach thus does not perform individual repeated mirrorings of the audio source position to determine the mirror position but instead may determine a relative offset to a reference position in the original room and then directly map this to an offset in the mirror room where it is combined with a mirror reference position to determine the mirror position. The Inventor has realized that by using relative position offsets with respect to a reference position in the original room, direct mapping can be applied to the offset. In particular, the mapping applied to the offset is not dependent on the audio source position (or the offset) and thus can be determined once and applied to all positions. Further, the mapping may reflect the mirrorings by reflecting the changes in direction resulting from the mirrorings but without requiring the mirror operations to be carried out. In particular, in many embodiments, the distance/size of the source position offset and the mirror position offset may be the same and the mapping may only map the direction to reflect the mirrorings between the original room and the mirror room.

In some embodiments, the mapping may for example be implemented as a predetermined function being applied to the source position offset. Specifically, in many embodiments, the mapping may be implemented as a Look-Up-Table (LUT) with the source position offset represented by a set of coordinates being the input for the table look-up and the output of the LUT being the corresponding coordinates of the mirror position offset.

In many embodiments, the mapping may be represented by a mapping matrix and the mapping may be applied to the source position offset by the source position offset represented as a vector being multiplied by the mapping matrix. Thus, multiplying the mapping matrix and the source position offset vector results in the mirror position offset vector. In many embodiments, the processing may be performed in three-dimensional space with the vectors comprising three coordinates and the mapping matrix being a 3×3 matrix thereby providing a mapping of a three component (specifically a three-dimensional) vector to another three component (specifically a three-dimensional) vector.

In some embodiments, the processing may not be three-dimensional but may for example be a two-dimensional processing. For example, it may be assumed that all audio sources and listening positions are at the same height and thus only the horizontal positions may vary with the vertical position being constant. In such cases, the offsets may be two-dimensional and specifically only represent offsets in the two-dimensional horizontal plane. In such a case, the mapping may be two dimensional, and specifically the mapping matrix may be a 2×2 matrix mapping a two dimensional source position offset to a two dimensional mirror position offset. Such an approach may not provide the same flexibility as a three dimensional processing, but may provide a more efficient processing with reduced complexity and reduced computational resource usage.

Specifically, for each virtual mirror source, $\bar{p}_{v_{new},i}$, representing a reflection of an audio source in the original room, a new mirror position for a changed position of the audio source can be calculated as:

$$\bar{p}_{v_{new},i} = \bar{p}_{v_{ref},i} + M_i(\bar{p}_{o_{new}} - \bar{p}_{o_{ref}})$$

with $\bar{p}_{v_{new},i}$ being the mirror reference position of mirror room i, $\bar{p}_{o_{ref}}$ the source reference position in the original room's reference point, $\bar{p}_{o_{new}}$ is the new original source position of the audio source, $M_i$ the relative modification matrix (the mapping matrix) for mirror room i, and $\bar{p}_{v_{new},i}$ is the new mirror position in mirror room i. The vectors $\bar{p}$ are column matrices, typically with three elements for three-dimensional simulation, and with $M_i$ being a 3×3 matrix.

The approach may reflect the realization of the Inventor that a movement of a certain distance in the original room may result in a movement by the same distance in each mirrored room. This position delta/offset of the corresponding virtual mirror sources in the mirrored rooms is not the same as in the original room due to the mirroring operations, and particularly for cases with the room being misaligned with the coordinate axes. As a result, it is not trivial in what direction a mirrored source moves for a given direction in the original room. However, in the approach, rather than determining this property by performing mirroring operations, the method is arranged to directly map the offset in the original room to the corresponding offset in the mirror room. Such a mapping may advantageously be used even if the boundaries are not aligned with the coordinate axes and may in this case provide a particularly efficient operation and resource saving.

The approach may be based on determining e.g. only once (e.g. as part of the initialization phase), for at least one reference position in the original room, a corresponding reference position in the mirror rooms by appropriate mirrorings. Similarly, the mappings for the direction, and specifically the mapping matrices, may be determined only once.

The use of mapping, and specifically the mapping matrix, allows low complexity update for moving audio sources. The mapping may capture how the coordinates of a point in the mirrored room change as a function of the changes of the corresponding point in the original room along the axes. Hence, any known position in the original room and corresponding virtual mirror source positions can be used to calculate the virtual mirror source position of an arbitrary new position inside the original room. The approach may be used to update existing, or create new, mirror source positions based on offsets to a reference position and applying the relative modification matrices to the corresponding reference mirrored source positions.

The approach allows the mirror source positions related to a moving source to be updated regularly without calculating (subsequent) mirroring operations and thus may provide a substantially improved performance.

It will be appreciated that the approach may also be used to determine room properties for the mirror rooms. For example, during initialization, the mappings, source reference position, and mirror reference positions may be determined. Based on these determinations, the processing circuit 203 may then proceed to determine the mirror room properties. For example, for each corner, a relative offset between the corner and the source position offset may be determined, the mapping may be applied to that offset, and the resulting offset may be combined with the mirror reference position to determine the corresponding mirror room corner. Such an approach may provide an efficient approach for determining properties of the mirror rooms.

The determination of the mapping may be done in different ways in different embodiments. For example, for a mirror room being a single mirroring of the original room around a boundary, the mapping may be considered by performing a mirror operation to positions in the mirror room which have offsets corresponding to unit vectors aligned with the axes of the coordinate system. For example, the processing circuit 203 may determine a first position by adding a [1,0,0] vector to the source reference position. It may then determine the offset in the mirror room by subtracting the mirror reference position from the mirrored position. This offset represents the mapping for a [1,0,0] offset, i.e. the dependence of the mirror position offset on the first coordinate of the source position offset. Thus, the coordinates may be used as the first row of the mapping matrix for the mirror room. The same approach may be applied to an offset of [0,1,0] and [0,0,1] respectively to determine the second and third rows of the mapping matrix.

For a further mirror room resulting from a sequence of multiple mirrorings, the same unit vectors may be used for the source room, and the sequence of mirrorings may be performed with the resulting position in the mirror room having the mirror reference position subtracted to provide the offset for the mirror room, and thus the appropriate row of the mapping matrix for the mirror room.

In many embodiments a reduced complexity and reduced computational burden may be achieved by using an iterative/correlated approach. In particular, for shoebox rooms, the mirrorings will be around the corresponding boundaries. Thus, mirroring around one boundary of a mirror room will be the same as the mirroring around the corresponding boundary of the original room. Thus, such a mirroring matches the corresponding mirroring from the original room. Thus, the mapping (matrix) determined for the mirror room resulting from that mirroring of the original room will also apply to the current mirroring. Accordingly, the mapping matrix can be used to represent this mirroring as well, i.e. the mirroring can be represented by the already determined mapping matrix. Thus, for a mirror room resulting from a sequence of mirrorings, each mirroring corresponds to a mapping matrix determined for a boundary of the original room. Accordingly, the overall mapping matrix for the mirror room can be determined as the result of multiplying the individual mapping (sub) matrices corresponding to the individual mirrorings. Specifically, the mapping matrix for a current mirror room may be determined by multiplying the mapping matrix for the last/new mirroring that generates the current mirror room (with this mapping matrix being the one determined for the corresponding boundary of the original room) and the mapping matrix that was determined for the mirror room from which the mirroring is performed. Thus, an iterative approach may be used.

In many embodiments, a set of boundary mirror mapping matrices may be determined which represent a change of directions resulting from a mirroring around a single room boundary. The boundary mirror mapping may represent the mapping that should be applied to offsets as a result of a single mirroring, and specifically for a single mirroring around a boundary of the original room. Such a single boundary imaging mapping matrix may be referred to as a boundary mirror mapping matrix. The set of boundary mirror mapping matrices may specifically include the mapping matrices for the mirror rooms that result from a single mirroring of the source room.

In many embodiments, some of the mirrorings around boundaries may result in boundary mirror mapping matrices that are the same. In particular, for shoebox shaped rooms, the boundary mirror mapping matrices for parallel boundaries (e.g. opposite walls) are the same. Thus, in some embodiments, parallel room boundaries of the first room are linked with the same boundary mirror mapping matrix. In some embodiments, at least two parallel room boundaries of the first room are linked with a single boundary mirror mapping matrix.

Thus, in some embodiments, the set of boundary mirror mapping matrices may comprise fewer matrices than the number of boundaries. For example, for three dimensional processing, the set of boundary mirror mapping matrices may include three boundary mirror mapping matrices, and for two dimensional processing, the set of boundary mirror mapping matrices may include two boundary mirror mapping matrices.

The approach may reduce the number of mirroring operations that are necessary to be performed and may instead extensively use mapping operations which can be performed with much less computational resource.

Specifically, during initialization, a single source position offset inside the simulated room may be mirrored around its boundaries (walls, floor, ceiling) in one or more orders.

Typically, especially when the room is not aligned with the coordinate axes, this is done using the mirrored boundary's normalized normal vector, $\bar{n}$ (column vector with $\|\bar{n}\|=1$). For example, by first finding value d that completes the boundary plane's equation.

$$n(1)\cdot x+n(2)\cdot y+n(3)\cdot z=d$$

This can be easily found by entering x,y,z coordinates of a point in the boundary (e.g. one of its corners).

To mirror a point $\bar{p}$, the nearest point in the boundary plane by finding $\alpha$ in $\bar{p}+\alpha\cdot\bar{n}$ that conforms to the plane's equation. This is achieved by $\alpha=d-\bar{p}^T\cdot\bar{n}$ where $(\bullet)^T$ denotes transposition.

Then, the mirrored point is given as $\bar{p}_m=\bar{p}+2\cdot\alpha\cdot\bar{n}$.

This principle can be used to mirror any position in the room. However, the operation is complex, and the described approach may in many embodiments use such an approach only to determine the mirror reference positions. In particular, other positions, including e.g. positions of the room itself (e.g. the corner positions) may be determined using the described mapping approach.

The mapping matrix may be derived from the normal vector of the mirror operation. Further, contributions for subsequent mirror operations can be combined by multiplying the matrices accordingly.

The matrix for a single mirroring operation may specifically be calculated according to:

$$M=[\bar{u}_x-2\cdot n(1)\cdot\bar{n}\quad \bar{u}_y-2\cdot n(2)\cdot\bar{n}\quad \bar{u}_z-2\cdot n(3)\cdot\bar{n}]$$

with $\bar{u}_x$, $\bar{u}_y$ and $\bar{u}_z$ the unit vectors of the x, y and z axes. Hence, typically $$\bar{u}_x=\begin{bmatrix}1\\0\\0\end{bmatrix},\ \bar{u}_y=\begin{bmatrix}0\\1\\0\end{bmatrix}\text{ and }\bar{u}_z=\begin{bmatrix}0\\0\\1\end{bmatrix}.$$

The mapping matrix for a single mirroring operation is symmetric and each row (and column) represents the resulting change in the mirror room when a position changes by 1 in the room it was mirrored from. I.e. row 1 corresponds to a change in (x,y,z) in the mirror room from a change of +1 in the x direction in the room at the opposite side of the considered boundary, row 2 to a change of +1 in the y direction, and row 3 to a change of +1 in the z direction.

Each mirroring operation creates a new mirrored room, and thus a new mirrored source with corresponding mapping matrix, say M'. Subsequently, that mirrored room may be mirrored again to get a mirrored source representing a higher order reflection. Then the matrix calculated from that subsequent mirroring operation M" may be combined with the matrix from the room it is mirrored from to provide a mapping matrix that represents the sequence of mirroring.

$$M=M'\cdot M''$$

By combining the mapping matrices from all mirroring operations of the sequence that results in a given mirror room from the original room, the combined mapping matrix relates changes in the original room to changes in the corresponding mirrored room.

The mirror mapping matrix for a certain mirror room may be determined efficiently by only multiplying at most one boundary mirror mapping matrix from each of the different parallel pairs, and only those boundary mirror mapping matrices for mirrorings that occur an odd number of times in the corresponding mirroring sequence. The boundary mirror mapping matrices result in the identity matrix when multiplied by themselves an even number of times.

Following the initialization, there is a reference position in the original room, $\bar{p}_{o_{ref}}$, and a set of reference mirrored positions, $\bar{p}_{v_{ref}}$, each with a corresponding mapping matrix, $M_i$.

As previously mentioned, for each virtual mirror source, $\bar{p}_{v_{new},i}$, the new position can be calculated by:

$$\bar{p}_{v_{new},i} = \bar{p}_{v_{ref},i} + M_i(\bar{p}_{o_{new}} - \bar{p}_{o_{ref}})$$

with $\bar{p}_{v_{new},i}$ the mirrored room i's reference point, $\bar{p}_{o_{ref}}$ the original room's reference point, $\bar{p}_{o_{new}}$ a new original source position and $\bar{p}_{v_{new},i}$ the mirrored room i's new virtual mirror source position. The vectors $\bar{p}$ are column vectors, typically of length three, and with $M_i$ a 3×3 matrix.

For a typical application, i ranges over a large set of I rooms (e.g. 62 for 3rd order, 128 for 4th order and 230 for 5th order). Since $(\bar{p}_{o_{new}} - \bar{p}_{o_{ref}})$ is the same for all i, it only needs to be calculated once. Thus, despite the large number of mirror rooms (and thus the high order of reflections being modelled), the approach may accordingly allow computationally very efficient operation.

Specifically, for any additional source or updated source position in the original room, only one offset vector calculation followed by I multiplications of this offset vector with a matrix and a summation with the corresponding mirror reference position vector. In addition to fewer operations being required, these operations are particularly suited for fast processing using modern processor architectures and may for example be suited for parallel processing architectures. They may be performed faster than an approach of iterating the mirroring approach for new or updated source positions.

For example, the previously presented example of fifth order reflections being modelled with an update rate of 90 Hz may result in a computational load of:

$$MOPS_{invention} = 90 \cdot (230 \cdot 16 \cdot N_{sources} + 3)$$

which results in 0.3-1.7 MOPS for updating one to five sources, and no room-finding bookkeeping or logic is needed. A reduction of at least 35-80% for typical numbers of animated sources in a room may be achieved.

Moreover, the algorithm for updating the mirrored sources can be executed on modern processors to run very efficiently using parallel hardware structures, whereas the rerunning of the more complex image source method algorithm using mirroring must be performed largely sequentially, moving from one room (i.e. one of the 230 mirrored rooms) to a small set (about 3) of next rooms. This further vastly increases the advantage of the proposed approach and would require even less throughput time than the 35-80% reduction based on MOPS alone. For real-time processing of audio in AR/VR this reduction is very significant and may enable new applications and/or a vastly improved user experience for a given processing unit.

In the above the term audio and audio source have been used but it will be appreciated that this is equivalent to the terms sound and sound source. References to the term "audio" can be replaced by references to the term "sound".

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A method comprising:

receiving data describing boundaries of a first room;

generating a plurality of mirror rooms of the first room,
  wherein each mirror room of the plurality of mirror rooms results from a plurality of mirrorings,
  wherein each mirroring is a mirroring of a previous mirror room around a boundary of the previous mirror room,
  wherein an initial previous mirror room for the plurality of mirrorings is the first room,
  wherein the plurality of mirror rooms comprises a first mirror room;

providing the first mirror room a mapping of directions in the first room to directions in the first mirror room;

determining a source reference position in the first room;

determining a first mirror reference position in the first mirror room, wherein the first mirror reference position is a position in the first mirror room, wherein the first mirror reference position is based on applying the mirroring in the first mirror room to the first source reference position;

determining a source position offset in the source room for a first audio source, wherein the source position offset is a position offset between the source reference position and a position of the first audio source;

determining a first mirror position offset in the first mirror room for the first audio source;

determining a mirror position for the first audio source in the first mirror room based on first mirror reference position and the first mirror position offset;

wherein determining the first mirror position offset comprises applying the mapping to the source position offset.

2. The method of claim 1, wherein the mapping is represented by a mapping matrix, wherein applying the mapping to the source position offset comprises multiplying the mapping matrix and the source position offset.

3. The method of claim 2, wherein the source position offset is a two-dimensional offset, wherein the mapping matrix is a 2×2 matrix.

4. The method of claim 2, wherein the source position offset is a three-dimensional offset, wherein the mapping matrix is a 3×3 matrix.

5. The method of claim 1, wherein the plurality of mirrorings for the first room is at least two, wherein the mapping matrix is a combination of a plurality of boundary mirror mapping matrices, wherein each boundary mirror mapping matrix represents a change of directions, wherein the change of directions is from a mirroring around a single room boundary.

6. The method of claim 5, wherein each room boundary of the first room is linked with one boundary mirror mapping matrix, wherein the mapping is a combination of the boundary mirror mapping matrices linked with room boundaries of mirrorings of the plurality of mirrorings for the first mirror room.

7. The method of claim 6, wherein parallel room boundaries of the first room are linked with the same boundary mirror mapping matrix.

8. The method of claim 1, wherein the mapping is a distance preserving mapping.

9. The method of claim 1 wherein the first mirror position offset is equal to the source position offset.

10. The method of claim 1, further comprising:

determining a room boundary position for a boundary of the first room;

determining a boundary position offset in the source room for the room boundary position, wherein the boundary position offset represents a position offset between the source reference position and the room boundary position;

determining a boundary position offset in the first mirror room by applying the mapping to the boundary position offset;

determining a mirror boundary position for the first mirror room based on the first mirror reference position and the boundary position offset.

11. The method of claim 1, wherein the first room is an orthotope, wherein the source reference position and the source position offset are represented by coordinates of coordinate axes, wherein coordinate axes are not aligned with edges of the orthotope.

12. The method of claim 1, further comprising determining a room response function for the first room, wherein the room response function comprises a reflection component, wherein the reflection component represents audio from the audio source as positioned at the mirror position.

13. The method of claim 1, further comprising rendering an audio output signal, wherein the output audio signal comprises a component from the audio source as is positioned at the mirror position.

14. A computer program stored on a non-transitory medium, wherein the computer program when executed on a processor performs the method as claimed in claim 1.

15. An apparatus comprising:

a processor circuit and a memory circuit, wherein the memory is arranged to store instructions for the processor circuit, wherein the processor circuit is arranged to receive data, wherein the data describes boundaries of a first room, wherein the processor circuit is arranged to generate a plurality of mirror rooms of the first room, wherein each mirror room of the plurality of mirror rooms results from a plurality of mirrorings, wherein each mirroring is a mirroring of a previous mirror room around a boundary of the previous mirror room, wherein an initial previous mirror room for the plurality of mirrorings is the first room, wherein the plurality of mirror rooms comprises a first mirror room, wherein the processor circuit is arranged to provide for at least a first mirror room of the plurality of mirror rooms a mapping of directions in the first room to directions in the first mirror room, wherein the processor circuit is arranged to determine a source reference position in the first room, wherein the processor circuit is arranged to determine a first mirror reference position in the first mirror room, wherein the first mirror reference position is a position in the first mirror room, wherein the first mirror reference position is based on applying the mirroring in the first mirror room to the first source reference position, wherein the processor circuit is arranged to determine a source position offset in the source room for a first audio source, wherein the source position offset is a position offset between the source reference position and a position of the first audio source, wherein the processor circuit is arranged to determine a first mirror position offset in the first mirror room for the first audio source, wherein the processor circuit is arranged to determine a mirror position for the first audio source in the first mirror room based on first mirror reference position and the first mirror position offset, wherein determining the first mirror position offset comprises applying the mapping to the source position offset.

16. The apparatus of claim 15, wherein the mapping is represented by a mapping matrix, wherein applying the mapping to the source position offset comprises multiplying the mapping matrix and the source position offset.

17. The apparatus of claim 15, wherein the plurality of mirrorings for the first room is at least two, wherein the mapping matrix is a combination of a plurality of boundary mirror mapping matrices, wherein each boundary mirror mapping matrix represents a change of directions, wherein the change of directions is from a mirroring around a single room boundary.

18. The apparatus of claim 17, wherein each room boundary of the first room is linked with one boundary mirror mapping matrix, wherein the mapping is a combination of the boundary mirror mapping matrices linked with room boundaries of mirrorings of the plurality of mirrorings for the first mirror room.

19. The apparatus of claim 18, wherein parallel room boundaries of the first room are linked with the same boundary mirror mapping matrix.

20. The apparatus of claim 15, wherein the mapping is a distance preserving mapping.

21. The apparatus of claim 15, wherein the first mirror position offset is equal to the source position offset.

22. The apparatus of claim 15, wherein the processor circuit is arranged to determine a room boundary position for a boundary of the first room, wherein the processor circuit is arranged to determine a boundary position offset in the source room for the room boundary position, wherein the boundary position offset represents a position offset between the source reference position and the room boundary position, wherein the processor circuit is arranged to determine a boundary position offset in the first mirror room by applying the mapping to the boundary position offset, wherein the processor circuit is arranged to determine a mirror boundary position for the first mirror room based on the first mirror reference position and the boundary position offset.

23. The apparatus of claim 15, wherein the first room is an orthotope, wherein the source reference position and the source position offset are represented by coordinates of coordinate axes, wherein coordinate axes are not aligned with edges of the orthotope.

24. The apparatus of claim 15, wherein the processor circuit is arranged to determine a room response function for the first room, wherein the room response function comprises a reflection component, wherein the reflection component represents audio from the audio source as positioned at the mirror position.

25. The apparatus of claim 15, further comprising rendering an audio output signal, wherein the output audio signal comprises a component from the audio source as is positioned at the mirror position.

* * * * *